US012577495B2

(12) United States Patent
Chandrasekaran et al.

(10) Patent No.: US 12,577,495 B2
(45) Date of Patent: Mar. 17, 2026

(54) FRAGRANCE MIXTURES CONTAINING 1-(4,4-DIMETHYLCYCLOHEXEN-1-YL) ETHANON

(71) Applicant: SYMRISE AG, Holzminden (DE)

(72) Inventors: Vijayanand Chandrasekaran, Holzminden (DE); Bernd Hölscher, Halle (DE); Julia Amos, Eschershausen (DE)

(73) Assignee: SYMRISE AG, Holzminden (DE)

(*) Notice: Subject to any disclaimer, the term of this patent is extended or adjusted under 35 U.S.C. 154(b) by 635 days.

(21) Appl. No.: 18/001,940

(22) PCT Filed: Jun. 18, 2020

(86) PCT No.: PCT/EP2020/067004
§ 371 (c)(1),
(2) Date: Dec. 15, 2022

(87) PCT Pub. No.: WO2021/254628
PCT Pub. Date: Dec. 23, 2021

(65) Prior Publication Data

US 2023/0227752 A1 Jul. 20, 2023

(51) Int. Cl.
*C11B 9/00* (2006.01)
*A61K 8/33* (2006.01)

(52) U.S. Cl.
CPC .................................. *C11B 9/0034* (2013.01)

(58) Field of Classification Search
USPC ........................................................ 512/24, 1
See application file for complete search history.

(56) References Cited

U.S. PATENT DOCUMENTS

| | | | |
|---|---|---|---|
| 8,389,466 | B2 | 3/2013 | Panten et al. |
| 2013/0303432 | A1 | 11/2013 | Hoelscher et al. |
| 2021/0395640 | A1 | 12/2021 | Hölscher et al. |

FOREIGN PATENT DOCUMENTS

| | | | | |
|---|---|---|---|---|
| EP | 2474301 | A1 | 7/2012 | |
| WO | WO-2020098901 | A1 * | 5/2020 | ............... A61K 8/35 |

OTHER PUBLICATIONS

International Search Report and Written Opinion issued on Mar. 11, 2021 for corresponding PCT Application No. PCT/EP2020/067004.
Office Action issued on Jun. 17, 2024 for corresponding Japanese Application No. 2022-577724.

* cited by examiner

*Primary Examiner* — Jessica Whiteley
(74) *Attorney, Agent, or Firm* — POLSINELLI PC

(57) ABSTRACT

The present invention relates to fragrance mixtures comprising or consisting of a compound of formula (I) and one or more fragrances having a green and/or flowery scent. The invention further provides methods for producing a fragrance mixture according to the invention and methods for enhancing and/or modifying a green and/or flowery scent by mixing a compound of formula (I) with one or more fragrances having a green and/or flowery scent. Moreover, the present invention provides perfumed products comprising a fragrance mixture of the present invention and methods for producing a perfumed product as well as a use of the compound of formula (I) to enhance and/or modify a green and/or flowery scent.

20 Claims, No Drawings

FRAGRANCE MIXTURES CONTAINING 1-(4,4-DIMETHYLCYCLOHEXEN-1-YL) ETHANON

CROSS-REFERENCE TO RELATED APPLICATIONS

This application is a national stage application (under 35 U.S.C. § 371) of PCT/EP2020/067004, filed Jun. 18, 2020, which is incorporated herein by reference in its entirety.

The present invention relates to fragrance mixtures comprising or consisting of a compound of formula (I) and one or more fragrances having a green and/or flowery scent. The invention further provides methods for producing a fragrance mixture according to the invention and methods for enhancing and/or modifying a green and/or flowery scent by mixing a compound of formula (I) with one or more fragrances having a green and/or flowery scent. Moreover, the present invention provides perfumed products comprising a fragrance mixture of the present invention and methods for producing a perfumed product as well as a use of the compound of formula (I) to enhance and/or modify a green and/or flowery scent.

Despite a large number of available fragrance substances, there is a constant need for novel compounds and combinations of compounds in the perfume and fragrance industry. In order to satisfy customers' needs, new fragrance profiles and complex olfactory impressions have to be developed on a regular basis. The industry is therefore constantly searching for new compounds, which exhibit special sensory properties and can serve as a basis for the composition of novel perfumes and fragrances. Such compounds should not only provide attractive olfactory impressions by themselves but also integrate harmoniously into fragrance compositions while adding further complexity to the overall impression. In addition, substances are of particular interest, which can be used in amounts where they do not provide a fragrance themselves but can enhance or modify other sensory impressions.

A further aspect, which is highly sought-after in the fragrance and perfume industry, is the ability of fragrance compounds and compound mixtures to mask and/or decrease unpleasant olfactory impressions. Such unpleasant impressions may be side notes of certain fragrances, which provide an otherwise pleasant scent, or they may be caused by additives that are commonly used in fragrance mixtures and products.

The search for suitable substances, however, is highly complex. On the one hand, the mechanism of olfactory perception is still not understood making it impossible to predict sensory impressions based on chemical structure. On the other hand, it is not possible to predict how a certain substance will affect other fragrances or complex fragrance profiles when added in various amounts. Therefore, even combining components with known fragrance properties at various proportions can result in mixtures with unexpected olfactory profiles.

Particularly desirable olfactory impressions for various applications in the perfume industry are green and flowery scents. These scents can vary in their freshness, fruitiness, softness and naturalness, which are generally considered to contribute to an overall pleasant impression. On the other hand, green and/or flowery scents may be accompanied by plastic or technical side notes, which are perceived as artificial and unpleasant.

It was an object of the present invention to provide fragrance mixtures with an improved green and/or flowery scent. In particular, fresh, fruity, soft and natural aspects of green and/or flowery fragrances should be enhanced while plastic or technical aspects should be masked and/or decreased. The fragrance mixtures should integrate well into perfume compositions, in particular perfume oils and be applicable in a wide range of products.

The above objectives are met by a fragrance mixture, preferably a perfume oil, comprising or consisting of:

(a) a compound of formula (I),

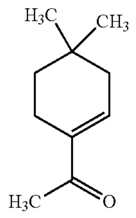

(I)

and (b) one or more fragrance(s) having a green and/or flowery scent, preferably wherein the one or more fragrance(s) having a green and/or flowery scent is/are selected from the group consisting of alcohols having a molecular weight in the range from 95 to 180 g/mol, esters having a molecular weight in the range from 140 to 230 g/mol and aldehydes and ketones having a molecular weight in the range from 135 to 230 g/mol.

It was found out in the context of the present invention that the compound of formula (I) (1-(4,4-dimethylcyclohexen-1-yl)-ethanon) even when used in amounts, in which it does not provide a fragrance itself, can enhance and/or modify the olfactory impression of fragrances having a green and/or flowery scent. Thus, green and flowery fragrances are improved in terms of their impact; and fruity, soft, fresh and natural aspects are emphasized. In addition, the presence of the compound of formula (I) is able to reduce plastic and technical aspects of the fragrances having a green and/or flowery scent.

The compound of formula (I) can be obtained as described in *Tetrahedron Lett.* 2008, 49, 6016-6018.

In the context of the present invention a "fragrance" refers to a compound having a scent or to refers to a scent itself. A fragrance or scent can comprise several "notes" or "aspects", which may be more or less pronounced. The respective notes or aspects of a scent may be individually emphasized or reduced/masked by interactions with other fragrances.

In a preferred embodiment, the one or more fragrance(s) having a green and/or flowery scent is/are selected from the group consisting of (3Z)-hex-3-en-1-ol, (3Z)-hex-3-en-1-yl acetate, 1-(5,5-dimethylcyclohexen-1-yl)pent-4-en-1-one, 2,4-dimethylcyclohex-3-ene-1-carbaldehyde, [(Z)-hex-3-enyl] methylcarbonate, allyl-2-(cyclohexoxy)acetate, 2-phenylethanol, 4-acetoxybenzyl acetate, methyl-2-(3-oxo-2-pentylcyclopentyl)acetate, 1-(4-isopropylcyclohexyl) ethanol, (E)-3-methyl-4-(2,6,6-trimethylcyclohex-2-en-1-yl)but-3-en-2-one, 3-methyl-5-phenyl-pentan-1-ol and 2,2-dimethyl-3-(3-methylphenyl)propan-1-ol.

The above compounds are also known as cis-3-hexenol, cis-3-hexenylacetate, Dynascone, Ligustral, Leafovert, Cyclogabanat, phenylethyl alcohol, benzylactete, Hedion, Mugetanol, Iraldein gamma, phenoxanol, and Majantol.

These compounds are fragrances having a green and/or flowery scent and their fragrance is positively affected by the presence of the compound of formula (I) as shown in table 1. The dosage of the compound of formula (I) is given with respect to the total weight of the respective fragrance.

TABLE 1

Effect of the compound of formula (I) on fragrances with a green and/flowery scent

| No.: | Name | Dosage Compound of Formula (I) | Fragrance |
|---|---|---|---|
| 1 | (3Z)-hex-3-en-1-ol | 0.3% | more fruity, softer |
| 2 | (3Z)-hex-3-en-1-yl acetate | 0.2% | more fruity, more fresh, more mint |
| 3 | 1-(5,5-dimethylcyclohexen-1-yl)pent-4-en-1-one | 0.3% | more fruity/apple |
| 4 | 2,4-dimethylcyclohex-3-ene-1-carbaldehyde | 0.3% | more green, less technical, |
| 5 | [(Z)-hex-3-enyl] methyl carbonate | 0.3% | more green, more impact |
| 6 | Allyl 2-(cyclohexoxy) acetate | 0.3% | more galbanum, more impact |
| 7 | 2-phenylethanol | 0.2% | more flowery/more rose, less technical |
| 8 | 4-Acetoxybenzyl acetate | 0.2% | more flowery, less technical |
| 9 | Methyl 2-(3-oxo-2-pentyl-cy-clopentyl)acetate | 0.05-0.1% | more impact, more jasmone |
| 10 | 1-(4-isopropylcyclohexyl)ethanol | 0.2% | more radiance, more fruity |
| 11 | (E)-3-methyl-4-(2,6,6-trimethylcyclohex-2-en-1-yl)but-3-en-2-one | 0.2% | more fruity, more natural, stronger impact |
| 12 | 3-methyl-5-phenyl-pentan-1-ol | 0.1% | more flowery/more rose, softer |
| 13 | 2.2-dimethyl-3-(3-methylphenyl)propan-1-ol | 0.3% | more impact, more fresh, more flowery |

In a fragrance mixture according to the invention, the compound of formula (I) is used in an amount of up to about a third of component (b) in weight, i.e. with respect to the weight of the fragrance or the sum of fragrances having a green and/or flowery scent, but it can also be used in much lower quantities. In this amount, the compound of formula (I) advantageously enhances or modifies the sensory impression of the fragrances having a green and/or flowery scent, i.e. component (b).

In one embodiment, in the fragrance mixture, preferably the perfume oil, described above, the component (a), i.e. the compound of formula (I), is present in an amount of 0.01 to 30 wt.-%, preferably, 0.1 to 20 wt.-%, particularly preferably 1 to 10 wt.-% with respect to the total weight of component (b).

During investigations it was found that these weight ratios are particularly advantageous. At these weight ratios, the intrinsic odor of the compound of formula (I) regularly is no longer or barely still perceptible, however the presence of the compound of formula (I) exerts a positive influence on the overall note of the fragrance mixture according to the invention. It is particularly surprising that even at low concentrations, the compound of formula (I) has an effect on the freshness and aura of the fragrance mixture, without bringing about or emphasizing a fruity odor to a relevant extent.

A fragrance mixture or perfume oil of the present invention may comprise further components besides the components (a) and (b) defined above. In particular, the mixture may comprise further components such as further fragrances, which are different from the fragrances having a green and/or flowery scent defined above. Moreover, the fragrance mixture may comprise solvents, additives and excipients typically used in fragrance mixtures, in particular in perfume oils.

In general, the compound of formula (I) and the fragrances of the component (b) according to the invention can advantageously be combined with a number of further fragrances to create an aroma composition.

In a preferred embodiment of the fragrance mixture described above, the fragrance mixture comprises a further component (c). Component (c) may be one or more compounds selected from fragrances other than the fragrances of component (b).

Examples of compounds of component (c) may be inferred from in S. Arctander, Perfume and Flavor Materials, Vol. I and II, Montclair, N.J. 1969, Eigenverlag, or K. Bauer et al., Common Fragrance and Flavor Materials, 4th Edition, Wiley-VCH, Weinheim 2001.

To be mentioned in detail are extracts from natural raw materials such as essential oils, concretes, absolues, resins, resinoids, balsams, tinctures such as ambra tincture; amyris oil; angelica seed oil; angelica root oil; anise oil; valerian oil; basil oil; tree moss absolue; bay oil; mugwort oil; benzoe resin; bergamot oil; beeswax absolue; birch tar oil; bitter almond oil; savory oil; bucco leaf oil; cabreuva oil; cade oil; calamus oil; camphor oil; cananga oil; cardamom oil; cascarilla oil; cassia oil; cassie absolue; castoreum absolue; cedar leaf oil; cedar wood oil; cistus oil; citronella oil; lemon oil; copaiba balsam; copaiba balsam oil; coriander oil; costus root oil; cumin oil; cypress oil; davana oil; dill herb oil; dill seed oil; eau de brouts absolue; oak moss absolue; elemi oil; tarragon oil; eucalyptus citriodora oil; eucalyptus oil; fennel oil; spruce needle oil; galbanum oil; galbanum resin; geranium oil; grapefruit oil; guaiac wood oil; gurjun balsam; gurjun balsam oil; helichrysum absolue; helichrysum oil; ginger oil; iris root absolue; iris root oil; jasmine absolue; calamus oil; chamomile oil blue; roman chamomile oil; carrot seed oil; cascarilla oil; pine needle oil; spearmint oil; caraway oil; labdanum oil; labdanum absolue; labdanum resin; lavandin absolue; lavandin oil; lavender absolue; lavender oil; lemongrass oil; lovage oil; distilled lime oil; pressed lime oil; linaloe oil; litsea cubeba oil; bay leaf oil; macis oil; marjoram oil; mandarin oil; massoi rind oil; mimosa absolue; musk seed oil; musk tincture; muscat sage oil; nutmeg oil; myrrh absolue; myrrh oil; myrtle oil; clove leaf oil; clove blossom oil; neroli oil; olibanum absolue; olibanum oil; opopanax oil; orange blossom absolue; orange oil; origanum oil; palmarosa oil; patchouli oil; perilla oil; Peru balsam oil; parsley leaf oil; parsley seed oil; petit grain oil; peppermint oil; pepper oil; pimento oil; pine oil; poley oil; rose absolue; rosewood oil; rose oil; rosemary oil; sage oil Dalmatian; sage oil Spanish; sandalwood oil; celery seed oil; spiked lavender oil; star anise oil; styrax oil; marigold oil; fir needle oil; tea tree oil; turpentine oil; thyme oil; tolu balsam; tonka absolue; tuberose absolue; vanilla extract; violet leaf absolue; verbena oil; vetiver oil; juniper berry oil; wine yeast oil; wormwood oil; wintergreen oil; ylang oil; ysop oil; zibet absolue; cinnamon leaf oil; cinnamon bark oil and fractions thereof, or ingredients isolated therefrom;

single fragrance substances from the group of hydrocarbons, such as e.g. 3-carene; α-pinene; β-pinene; α-terpinene; γ-terpinene; p-cymol; bisabolene; camphene; caryophyllene; cedrene; farnesene; limonene; longifolene; myrcene; ocimene; valencene; (E,Z)-1,3,5-undecatriene; styrene; diphenylmethane;

aliphatic alcohols such as e.g. hexanol; octanol; 3-octanol; 2,6-dimethylheptanol; 2-methyl-2-heptanol; 2-methyl-2-octanol; (E)-2-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

aliphatic aldehydes and their acetals such as e.g. hexanal; heptanal; octanal; nonanal; decanal; undecanal; dodecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-9-undecenal; 2,6,10-trimethyl-5,9-undecadienal; heptanaldiethylacetal; 1,1-dimethoxy-2,2,5-trimethyl-4-hexene; citronellyl oxyacetaldehyde; 1-(1-methoxypropoxy)-(E/Z)-3-hexene;

aliphatic ketones and their oximes such as e.g. 2-heptanone; 2-octanone; 3-octanone; 2-nonanone; 5-methyl-3-heptanone; 5-methyl-3-heptanone oxime; 2,4,4,7-tetramethyl-6-octen-3-one; 6-methyl-5-hepten-2-one;

aliphatic sulphur-containing compounds such as e.g. 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol;

aliphatic nitriles such as e.g. 2-nonenoic acid nitrile; 2-undecenoic acid nitrile; 2-tridecenoic acid nitrile; 3,12-tridecadienoic acid nitrile; 3,7-dimethyl-2,6-octadienoic acid nitrile; 3,7-dimethyl-6-octenoic acid nitrile;

esters of aliphatic carboxylic acids, e.g. (E)- and (Z)-3-hexenyl formate; ethyl acetoacetate; isoamyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl 2-methyl pentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate; 4-methyl-2-pentyl crotonate;

acyclic terpene alcohols such as e.g. geraniol; nerol; lavadulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol 2,6-dimethyl-2,5,7-octatrien-1-ol; and their formates, acetates, propionates, isobutyrates, butyrates, isovalerates, pentanoates, hexanoates, crotonates, tiglinates and 3-methyl-2-butenoates;

acyclic terpene aldehydes and ketones such as e.g. citronellal; 7-methoxy-3,7-dimethyloctanal; 2,6,10-trimethyl-9-undecenal; geranylacetone; and the dimethyl and diethyl acetals of geranial, neral;

cyclic terpene alcohols such as e.g. menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and their formates, acetates, propionates, isobutyrates, butyrates, isovalerianates, pentanoates, hexanoates, crotonates, tiglinates and 3-methyl-2-butenoates;

cyclic terpene aldehydes and ketones such as e.g. menthone; isomenthone; 8-mercaptomenthan-3-one; carvone; camphor; fenchone; alpha-ionone; beta-ionone; alpha-n-methylionone; beta-n-methylionone; alpha-isomethylionone; beta-isomethyl-ionone; alpha-iron; beta-damascenone; 1-(2,4,4-trimethyl-2-cyclohexen-1-yl)-2-buten-1-one; 1,3,4,6,7,8a-hexahydro-1,1,5,5-tetramethyl-2H-2,4a-methano-naphthalen-8(5H)-one; 2-methyl-4-(2,6,6-trimethyl-1-cyclohexen-1-yl)-2-butenal; nootkatone; dihydronootkatone; 4,6,8-megastigmatrien-3-one; alpha-sinensal; beta-sinensal; acetylated cedarwood oil (methylcedrylketone);

cyclic alcohols such as e.g. 4-tert.-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

cycloaliphatic alcohols such as e.g. alpha,3,3-trimethylcyclohexylmethanol; 1-(4-isopropyl-cyclohexyl)ethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

cyclic and cycloaliphatic ethers such as e.g. cineol; cedryl methyl ether; cyclododecyl methyl ether; 1,1-dimethoxycyclododecane; (ethoxymethoxy)cyclo-dodecane; alpha-cedrene epoxide; 3a,6,6,9a-tetramethyldodecahydro-naphtho[2,1-b]furane; 3a-ethyl-6,6,9a-trimethyldodecahydronaphtho[2,1b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

cyclic and macrocyclic ketones such as e.g. 4-tert.-butylcyclohexanone; 2,2,5-trimethyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert.-pentylcyclohexanone; 5-cyclohexadecen-1-one; 6,7-dihydro-1,1,2,3,3-pentamethyl-4(5H)-indanone; 8-cyclohexadecen-1-one; 9-cycloheptadecen-1-one; cyclopentadecanone; cyclohexadecanone;

cycloaliphatic aldehydes such as e.g. 2-methyl-4-(2,2,6-trimethyl-cyclohexen-1-yl)-2-butenal; 4-(4-hydroxy-4-methylpentyl)-3-cyclohexene carbaldehyde; 4-(4-methyl-3-penten-1-yl)-3-cyclohexene carbaldehyde;

cycloaliphatic ketones such as e.g. 1-(3,3-dimethylcyclohexyl)-4-penten-1-one; 2,2-dimethyl-1-(2,4-dimethyl-3-cyclohexen-1-yl)-1-propanone; 1-(5,5-dimethyl-1-cyclohexen-1-yl)-4-penten-1-one; 2,3,8,8-Tetramethyl-1,2,3,4,5,6,7,8-octahydro-2-naphtalenylmethylketone; methyl-2,6,10-trimethyl-2,5,9-cyclododecatrienylketone; tert.-butyl-(2,4-dimethyl-3-cyclohexen-1-yl)ketone;

esters of cyclic alcohols such as e.g. 2-tert-butylcyclohexyl acetate; 4-tert-butylcyclohexyl acetate; 2-tert-pentylcyclohexyl acetate; 4-tert-pentylcyclohexyl acetate; 3,3,5-trimethylcyclohexyl acetate; decahydro-2-naphthyl acetate; 2-cyclo-pentylcyclopentylcrotonate; 3-pentyltetrahydro-2H-pyran-4-yl acetate; decahydro-2,5,5,8a-tetramethyl-2-naphthyl acetate; 4,7-methano-3a,4,5,6,7,7a-hexa-hydro-5, or 6-indenyl acetate; 4,7-methano-3a,4,5,6,7,7a-hexahydro-5, or 6-indenyl propionate; 4,7-methano-3a,4,5,6,7,7a-hexahydro-5, or 6-indenyl isobutyrate; 4,7-methanooctahydro-5, or 6-indenyl acetate;

esters of cycloaliphatic alcohols such as e.g. 1-cyclohexylethylcrotonate;

esters of cycloaliphatic carboxylic acids such as e.g. allyl-3-cyclohexylpropionate; allylcyclohexyloxyacetate; cis- and trans-methyldihydrojasmonate; cis- and trans-methyljasmonate; methyl-2-hexyl-3-oxocyclopentanecarboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane-2-acetate;

araliphatic alcohols such as e.g. benzyl alcohol; 1-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

esters of araliphatic alcohols and aliphatic carboxylic acids such as e.g. benzylacetate; benzyl propionate; benzyl isobutyrate; benzyl isovalerianate; 2-phenylethyl acetate; 2-phenylethyl propionate; 2-phenylethyl isobutyrate; 2-phenyl ethyl isovalerate; 1-phenylethyl acetate; alpha-trichloromethylbenzyl acetate; alpha,alpha-dimethylphenylethyl acetate; alpha,alpha-dimethylphenylethyl butyrate; cinnamyl acetate; 2-phenoxyethyl isobutyrate; 4-methoxybenzyl acetate;

araliphatic ethers such as e.g. 2-phenylethyl methyl ether; 2-phenylethyl isoamyl ether; 2-phenylethyl-1-ethoxyethyl ether; phenylacetaldehyde dimethylacetal; phenylacetaldehyde diethylacetal; hydratropaaldehyde dimethylacetal; phenylacetaldehyde glycerol acetal; 2,4,6-trimethyl-4-phenyl-1,3-dioxane; 4,4a,5,9b-tetrahydroindeno[1,2-d]-m-dioxin; 4,4a,5,9b-tetrahydro-2,4-dimethylindeno[1,2-d]-m-dioxin;

aromatic and araliphatic aldehydes such as e.g. benzaldehyde; phenylacetaldehyde; 3-phenylpropanal; hydratropaaldehyde; 4-methylbenzaldehyde; 4-methylphenylacetaldehyde; 3-(4-ethylphenyl)-2,2-dimethylpropanal; 2-methyl-3-(4-isopropylphenyl) propanal; 2-methyl-3-(4-isobutylphenyl)propanal; 3-(4-tert.-butyl-phenyl)propanal; cinnamic aldehyde; alpha-butyl cinnamic aldehyde; alpha-hexyl cinnamic aldehyde; 3-methyl-5-phenylpentanal; 4-methoxybenzaldehyde; 4-hydroxy-3-methoxybenzaldehyde; 4-Hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

aromatic and araliphatic ketones such as e.g. acetophenone; 4-methylacetophenone; 4-methoxyacetophenone; 4-tert.-butyl-2,6-dimethylaceto-phenone; 4-phenyl-2-butanone; 4-(4-hydroxyphenyl)-2-butanone; 1-(2-naphtha-lenyl)ethanone; 2-benzofuranylethanone; (3-methyl-2-benzofuranyl)ethanone; benzophenone; 1,1,2,3,3,6-hexamethyl-5-indanylmethylketone; 6-tert-butyl-1,1-di-methyl-4-indanylmethylketone; 1-[2,3-dihydro-1,1,2,6-tetramethyl-3-(1-methylethyl)-1H-5-indenyl]ethanone; 5',6',7',8'-tetrahydro-3',5',5',6',8',8'-hexamethyl-2-aceto-naphthone;

aromatic and araliphatic carboxylic acids and their esters such as e.g. benzoic acid; phenylacetic acid; methyl benzoate; ethyl benzoate; hexyl benzoate; benzyl benzoate; methyl phenyl acetate; ethyl phenyl acetate; geranyl phenyl acetate; phenylethyl phenyl acetate; methyl cinnamate; ethyl cinnamate; benzyl cinnamate; phenylethyl cinnamate; cinnamyl cinnamate; allyl phenoxy acetate; methyl salicylate; hexyl salicylate; cyclohexyl salicylate; cis-3-hexenyl salicylate; benzylsalicylate; phenylethyl salicylate; methyl 2,4-dihydroxy-3,6-dimethylbenzoate; ethyl-3-phenylglycidate; ethyl-3-methyl-3-phenylglycidate;

nitrogen-containing aromatic compounds such as e.g. 2,4,6-trinitro-1,3-dimethyl-5-tert.butylbenzene; 3,5-dinitro-2,6-dimethyl-4-tert.-butylacetophenone; cinnamic acid nitrile; 3-methyl-5-phenyl-2-pentenoic acid nitrile; 3-methyl-5-phenylpentanoic acid nitrile; methylanthranilate; methy-N-methylanthranilate; Schiff bases of methylanthranilate with 7-hydroxy-3,7-dimethyloctanal, 2-methyl-3-(4-tert.-butyl-phenyl)propanal or 2,4-dimethyl-3-cyclohexene carbaldehyde; 6-isopropyl quinoline; 6-isobutylquinoline; 6-sec.-butylquinoline; 2-(3-phenylpropyl)pyridine; indole; skatol; 2-methoxy-3-isopropylpyrazine; 2-isobutyl-3-methoxypyrazine;

phenols, phenyl ethers and phenylesters such as estragol; anethol; eugenyl methylether; isoeugenol; isoeugenyl methylether; thymol; carvacrol; diphenylether; beta-naphthylmethylether; beta-naphthylethylether; beta-naphthyliso-butylether; 1,4-dimethoxybenzol; eugenylacetate; 2-methoxy-4-methylphenol; 2-ethoxy-5-(1-propenyl)phenol; p-kresylphenylacetate;

heterocyclic compounds such as e.g. 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

lactones such as e.g. 1,4-octanolide; 3-methyl-1,4-octanolide; 1,4-nonanolide; 1,4-decanolide; 8-decene-1,4-olide; 1,4-undecanolide; 1,4-dodecanolide; 1,5-decanolide; 1,5-dodecanolide; 4-methyl-1,4-decanolide; 1,15-pentadecanolide; 1,16-hexadeca-nolide; 9-hexadecene-1,16-olide; 10-oxa-1,16-hexadecanolide; 11-oxa-1,16-hexa-decanolide; 12-oxa-1,16-hexadecanolide; ethylene-1,12-dodecanedioate; ethylene-1,13-tridecanedioate; 2,3-dihydrocoumarin; octahydrocoumarin.

In a preferred embodiment of the fragrance mixture, preferably the perfume oil, described above, the fragrance mixture comprises one or more further components, in particular selected from the group consisting of further fragrances, solvents, additives and excipients.

Overall, a fragrance mixture comprises only a small percentage by weight of the compound of formula (I). In particular, the amount of formula (I) is so small that its own fragrance is not perceived within the fragrance mixture but rather only its effect on the fragrances having a green and/or flowery scent can be perceived.

In another preferred embodiment of the fragrance mixture, preferably the perfume oil, described in any of the embodiments above, the amount of the compound of formula (I) is in a range from 0.01 to 10 wt.-%, preferably 0.1 to 7 wt.-%, particularly preferably 1 to 5 wt.-%, with respect to the total weight of the fragrance mixture.

The fragrance mixtures according to the invention may be adsorbed to a carrier which ensures both a fine distribution of the fragrance substances in a product and a controlled release during application. Such carriers may be porous inorganic materials such as light sulphate, silica gels, zeolites, gypsums, clays, clay granules, gas concrete, etc. or organic materials such as wood, cellulose-based materials, sugars, dextrins (e.g. maltodextrin) or plastics such as PVC, polyvinyl acetates or polyurethanes. The mixture according to the invention and a carrier may represent a perfumed product according to the invention (as described below).

Fragrance mixtures or products according to the invention may also be present in microencapsulated form, spray-dried form, as inclusion complexes or as extrusion products and—in case of a fragrance composition—may be added in this form to a product to be perfumed (as described below).

If applicable, the properties of such modified mixtures or products can be further optimised by so-called "coating" with suitable materials in view of a more targeted release of fragrance, preferably using wax-like plastics such as e.g. polyvinyl alcohol. The resulting products in turn are products according to the invention.

Microencapsulation can, for example, be achieved by the so-called coacervation process with the aid of capsule materials, e.g. polyurethane-like substances or soft gelatine. Spray-dried products are preferably produced by spray-drying an emulsion or dispersion containing the fragrance composition, whereby modified starches, proteins, dextrins and vegetable gums can be used as carriers. Inclusion complexes can be prepared e.g. by incorporating dispersions of the fragrance composition and cyclodextrins or urea derivatives into a suitable solvent, e.g. water. Extrusion products can be obtained e.g. by fusing the fragrance compositions with a suitable wax-like substance and by extrusion followed by solidification, if applicable in a suitable solvent, e.g. isopropanol.

The present invention also provides a method for producing a fragrance mixture, preferably a perfume oil, in particular as described in any of the embodiments above, comprising or consisting of the following step:

(i) mixing component (a) with component (b) as defined above, preferably wherein component (a) is mixed with component (b) in an amount of 0.01 to 30 wt.-%, preferably 0.1 to 20 wt.-%, particularly preferably 1 to 10 wt.-%, with respect to the total weight of component (b) and, optionally, with further components.

As described above, the compound of formula (I) advantageously is capable of enhancing and improving the sensory impression of fragrances having a green and/or flowery scent in a fragrance mixture. By combining fragrances having a green and/or flowery scent with a compound of formula (I), the green and/or flowery scents are enhanced, thus providing a higher impact, modified to emphasize pleasant aspects such as fruity, soft, fresh and natural notes and at the same time plastic and technical aspects are reduced. These effects can be inferred from table 1.

The present invention therefore also relates to a method for enhancing and/or modifying a green and/or flowery scent, in particular wherein modifying a green and/or flowery scent renders the scent more fruity and/or softer and/or more fresh and/or more natural, and/or masks or decreases a plastic or technical note comprising the following step:

(i) mixing a compound of formula (I) as defined above with one or more fragrances having a green and/or flowery scent, preferably wherein the one or more fragrance(s) having a green and/or flowery scent is/are selected from the group consisting of alcohols having a molecular weight in the range from 95 to 180 g/mol, esters having a molecular weight in the range from 140 to 230 g/mol and aldehydes and ketones having a molecular weight in the range from 135 to 230 g/mol.

In a preferred embodiment of the method for enhancing and/or modifying a green and/or flowery scent described above, the one or more fragrance(s) having a green and/or flowery scent is/are selected from the group consisting of (3Z)-hex-3-en-1-ol, (3Z)-hex-3-en-1-yl acetate, 1-(5,5-dimethylcyclohexen-1-yl)pent-4-en-1-one, 2,4-dimethylcyclohex-3-ene-1-carbaldehyde, [(Z)-hex-3-enyl] methylcarbonate, allyl-2-(cyclohexoxy)acetate, 2-phenylethanol, 4-acetoxybenzyl acetate, methyl-2-(3-oxo-2-pentylcyclopentyl)acetate, 1-(4-isopropylcyclohexyl)ethanol, (E)-3-methyl-4-(2,6,6-trimethylcyclohex-2-en-1-yl)but-3-en-2-one, 3-methyl-5-phenyl-pentan-1-ol and 2,2-dimethyl-3-(3-methylphenyl)propan-1-ol.

In a further preferred embodiment of the method for enhancing and/or modifying a green and/or flowery scent according to any of the embodiments described above, the compound of formula (I) is mixed with the one or more fragrances having a green and/or flowery scent in an amount of 0.01 to 30 wt.-%, preferably, 0.1 to 20 wt.-%, particularly preferably 1 to 10 wt.-%, with respect to the total weight of the one or more fragrances having a green and/or flowery scent.

The method for enhancing and/or modifying a green and/or flowery scent according to any of the embodiments described above may further comprise the mixing with further components, in particular selected from the group consisting of further fragrances, solvents, additives and excipients. The further component may be added to the compound of formula (I) before mixing it with the one or more fragrance(s) having a green and/or flowery scent, or the further components may be mixed with the one or more fragrance(s) having a green and/or flowery scent before the compound of formula (I) is added.

In a preferred embodiment, the method for enhancing and/or modifying a green and/or flowery scent according to any of the embodiments described above produces a fragrance mixture, in particular a perfume oil, as described in any of the embodiments above. In the fragrance mixture obtained, the amount of the compound of formula (I) is in a range from 0.01 to 10 wt.-%, preferably 0.1 to 7 wt.-%, particularly preferably 1 to 5 wt.-%, with respect to the total weight of the fragrance mixture.

Advantageously, the fragrance mixtures, in particular the perfume oils, according to the present invention can be integrated into a wide range of products and impart a pleasant sensorial impression if present in suitable amount as described further below.

The present invention also relates to a perfumed product comprising a fragrance mixture, preferably a perfume oil, according to any one of the embodiments described above.

According to a preferred embodiment, the perfumed product is selected from the group consisting of perfume extracts, eau de parfums, eau de toilettes, after-shave, eau de colognes, pre-shave-products, splash colognes, perfumed wet wipes, acidic, alkalic and neutral cleaning agents, textile refreshener, iron aids, liquid laundry soaps, laundry soap powders, laundry pretreatment agents, fabric softeners, cleaning soaps, cleaning tabs, disinfectants, surface disinfectants, air improver, aerosol sprays, waxes and polishes, body care products, hand crèmes and lotions, foot crèmes and lotions, hair removal crèmes and lotions, aftershave crèmes and lotions, tanning crèmes and lotions, hair care products, deodorants and antiperspirants, products of decorative cosmetics, candles, lamp oils, incense sticks, insecticides, repellents and blowing agents.

In a further preferred embodiment of the perfumed product according to any of the embodiments described above, the fragrance mixture, preferably the perfume oil, is present in an amount of 0.01 to 10 wt.-%, preferably 0.1 to 7 wt.-%, particularly preferably 1 wt.-% to 5 wt.-%, with respect to the total weight of the product.

The present invention also relates to a method of producing a perfumed product, comprising the steps:

(i) providing a fragrance mixture according to any of the embodiments described above, (ii) providing the further components of the perfumed product, and (iii) contacting the further components of the perfumed product provided in step (ii) with a sensorially effective amount of the fragrance mixture provided in step (i), wherein the amount of the compound of formula (I) is sufficient to enhance and/or modify the green and/or flowery scent of the fragrance(s) of component (b), wherein modifying a green and/or flowery scent renders the scent more fruity and/or softer and/or more fresh and/or more natural, and/or wherein the amount of the compound of formula (I) is sufficient to mask or decrease a plastic or technical note of the fragrance(s) of component (b), or (I) providing the components of the perfumed product, which are not (a) or (b) or a fragrance mixture as defined in any one of the embodiments described above, (II) mixing the components of the perfumed product provided in step (I) with the component (b) of the fragrance mixture as defined in any one of the embodiments described above, so that a mixture results, in which the component (b) is present in a sensorially effective amount, and (III) contacting the mixture from step (II) with an amount of the compound of formula (I), which is sufficient to enhance and/or modify the green and/or flowery scent of the fragrance(s) of component (b), wherein modifying a green and/or flowery scent renders the scent more fruity and/or softer and/or more fresh and/or more natural, and/or sufficient to mask or decrease a plastic or technical note of the fragrance(s) of component (b).

A sensorially effective amount refers to a total amount of the fragrance mixture, preferably the perfume oil, according to the invention, which exerts a sensorial effect. Thus, a sensorially effective amount is an amount, in which the sensorial effect of the fragrance mixture can be perceived in the product by a user in comparison to a product, which does not comprise the compound or mixture of compounds of the present invention. Suitable amounts to provide this effect are 0.01 to 10 wt.-%, preferably 0.1 to 7 wt.-%, particularly preferably 1 wt.-% to 5 wt.-%, with respect to the total weight of the product.

The present invention also relates to the use of a compound of formula (I) as defined above to enhance and/or modify a green and/or flowery scent of one or more fragrances having a green and/or flowery scent, in particular wherein modifying a green and/or flowery scent renders the scent more fruity and/or softer and/or more fresh and/or more natural, and/or masks or decreases a plastic or technical note of one or more fragrances having a green and/or flowery scent, preferably wherein the one or more fragrance(s) having a green and/or flowery scent is/are selected from the group consisting of alcohols having a molecular weight in the range from 95 to 180 g/mol, esters having a molecular weight in the range from 140 to 230 g/mol and aldehydes and ketones having a molecular weight in the range from 135 to 230 g/mol.

In a preferred embodiment of the use described above, the compound of formula (I) is used to enhance and/or modify the scent of one or more fragrance(s) selected from the group consisting of (3Z)-hex-3-en-1-ol, (3Z)-hex-3-en-1-yl acetate, 1-(5,5-dimethylcyclohexen-1-yl)pent-4-en-1-one, 2,4-dimethylcyclohex-3-ene-1-carbaldehyde, [(Z)-hex-3-enyl] methylcarbonate, allyl-2-(cyclohexoxy)acetate, 2-phenylethanol, 4-acetoxybenzyl acetate, methyl-2-(3-oxo-2-pentylcyclopentyl)acetate, 1-(4-isopropylcyclohexyl) ethanol, (E)-3-methyl-4-(2,6,6-trimethylcyclohex-2-en-1-yl)but-3-en-2-one, 3-methyl-5-phenyl-pentan-1-ol and 2,2-dimethyl-3-(3-methylphenyl)propan-1-ol and/or to mask or decrease a plastic or technical note in one or more of these fragrances.

In a further preferred embodiment of the use according to any of the embodiments described above, the compound of formula (I) is used in an amount of 0.01 to 30 wt.-%, preferably, 0.1 to 20 wt.-%, particularly preferably 1 to 10 wt.-%, with respect to the total weight of the one or more fragrance(s) having a green and/or flowery scent.

In yet another preferred embodiment of the use according to any of the embodiments described above, the compound of formula (I) is used in a fragrance mixture, preferably a perfume oil, as described in any of the embodiments described above. In this embodiment, preferably the compound of formula (I) is present in a range from 0.01 to 10 wt.-%, preferably 0.1 to 7 wt.-%, particularly preferably 1 to 5 wt.-%, with respect to the total weight the fragrance mixture.

The present invention is explained in more detail using the following non-limiting examples.

EXAMPLE 1

Perfume Oil 1

| | |
|---|---|
| ACETESSIGSAEUREETHYLESTER | 2 |
| FLORALOZONE | 0.2 |
| HEXENOL CIS-3 | 0.4 |
| HEXENYLACETAT CIS-3 | 0.4 |
| LEAFOVERT ® | 0.3 |
| LIGUSTRAL | 0.5 |
| ALLYLAMYLGLYCOLAT | 0.1 |
| GLYCOLIERRAL | 1 |
| STYROLYLACETAT | 0.5 |
| DIHYDROMYRCENOL | 20 |
| LINALYLACETAT | 10 |
| CITRONENOEL ITAL. | 10 |
| METHYLANTHRANILAT | 0.6 |
| EUCALYPTOL NAT. 10% BB | 1 |
| CARDAMOMENOEL GUATEMALA | 1 |
| ALDEHYD C18 SOG. | 0.1 |
| LILIAL | 30 |
| CALONE | 0.3 |
| CANTHOXAL | 1 |
| HELIONAL | 10 |
| LYRAL | 20 |
| ETHYLLINALOOL | 1 |
| LINALOOL | 10 |
| PHENYLETHYLDIMETHYLCARBINOL | 7 |
| PHENYLETHYLALKOHOL | 1 |
| GERANIOL COEUR | 1 |
| CITRONELLYLACETAT EXTRA | 1 |
| DAMASCON ALPHA | 0.1 |

-continued

| | |
|---|---|
| RESEDA BODY | 0.1 |
| HEDION | 210 |
| HEXYLZIMTALDEHYD ALPHA | 1 |
| JASMON CIS | 0.1 |
| HEXENYLSALICYLAT CIS-3 | 14 |
| IONON BETA | 1 |
| IRALDEIN GAMMA REIN IFF | 30 |
| HELIOTROPIN | 5 |
| VANILLIN | 3 |
| CUMARIN | 3 |
| VERTOFIX | 3 |
| CASHMERAN | 1 |
| ISO E SUPER | 100 |
| TRIMOFIX O BM | 1 |
| SANDALORE | 15 |
| SANDRANOL ® | 1 |
| GUAJAKHOLZOEL | 2 |
| AMBROXIDE | 4 |
| AMBRETTOLIDE | 2 |
| ETHYLENBRASSYLAT | 108 |
| EXALTENONE 942008 | 3 |
| GLOBALIDE ® | 20 |
| MACROLIDE ® SUPRA | 51 |
| MUSCENONE | 2 |
| ZIBETON | 0.3 |
| GALAXOLID 50% IN BB | 20 |
| ALKOHOL, FUER PARFUEMERIE VERG. SD39C | 13 |
| BENZYLALKOHOL DD | 10 |
| BENZYLBENZOAT M | 245 |
| HYDROXYCITRONELLOL | 1 |
| Parts in g: | 1.000.00 |

2 wt.-% of the compound of formula (I) are added to perfume oil 1.

EXAMPLE 2

Perfume Oil 2

| | |
|---|---|
| ALDEHYD C12 LAURIN | 5 |
| FARENAL ® | 2 |
| PROFARNESAL | 1 |
| FLORALOZONE | 25 |
| HEXENOL CIS-3 | 7 |
| HEXENYLACETAT CIS-3 | 5 |
| LEAFOVERT ® | 3 |
| LIGUSTRAL | 5 |
| PHENYLACETALDEHYD 50% PEA | 45 |
| PHENYLACETALDEHYD DIMETHYLACETAL | 45 |
| MELONAL | 8 |
| CYCLAMENALDEHYD | 15 |
| CALONE | 8 |
| FLORHYDRAL | 5 |
| MAJANTOL ® | 55 |
| MAYOL | 8 |
| MUGETANOL | 35 |
| ETHYLLINALOOL | 45 |
| DIMETHYLBENZYLCARBINYLACETAT | 30 |
| PHENYLETHYLALKOHOL | 149.5 |
| CITRONELLOL 950 | 30 |
| DAMASCONE DELTA | 3 |
| HYACINTHE BODY | 8 |
| RESEDA BODY | 5 |
| BENZYLACETAT | 150 |
| HEDION | 80 |
| HEXYLZIMTALDEHYD ALPHA | 45 |
| AMYLSALICYLAT N | 35 |
| HEXYLSALICYLAT | 25 |
| NONADIENAL TRANS, CIS-2,6 10% IPM | 0.5 |
| ZIMTALKOHOL | 7 |
| HERBYLPROPIONAT | 45 |
| ISO E SUPER | 45 |
| ETHYLENBRASSYLAT | 20 |
| Parts in g: | 1,000.00 |

3 wt.-% of the compound of formula (I) are added to perfume oil 2.

EXAMPLE 3

Perfume Oil 3

| | |
|---|---|
| FLORAZON | 1 |
| HEXENOL CIS-3 | 1.3 |
| HEXENYLACETAT CIS-3 | 1.2 |
| HEXENYLBUTYRAT CIS-3 | 1 |
| LEAFOVERT ® | 0.5 |
| LIGUSTRAL | 0.6 |
| MAGNOLAN | 12 |
| DIHYDROMYRCENOL | 5 |
| LINALYLACETAT | 6 |
| OXANTHIA 50% IN TEC | 2 |
| HEXYLACETAT | 1.5 |
| ISOAMYLACETAT | 1.5 |
| JASMAPRUNAT | 10 |
| ALDEHYD C14 SOG | 0.5 |
| FRAMBINON ® | 5 |
| ETHYLMALTOL | 0.5 |
| FLOROSA BM/PYRANOL | 40 |
| MAJANTOL ® | 1 |
| LINALOOL COEUR (FASS) | 30 |
| DIMETHYLBENZYLCARBINYLACETAT | 10 |
| ROSENOXID HIGH CIS | 2 |
| PHENYLETHYLALKOHOL | 150 |
| PHENYLETHYLMETHYLETHER | 0.5 |
| CITRONELLOL 950 | 30 |
| GERANIOL 60 B | 45 |
| DAMASCENON | 0.7 |
| DIPHENYLOXID | 10 |
| BENZYLACETAT | 10 |
| HEDION | 20 |
| HEXYLZIMTALDEHYD ALPHA | 40 |
| JASMON CIS 10% DOC | 2 |
| HEXYLSALICYLAT | 30 |
| IONON BETA | 12 |
| VANILLIN | 2 |
| CUMARIN 10% DOC | 2 |
| HERBAFLORAT | 20 |
| CEDERNHOLZOEL VIRGINIA | 9 |
| CASHMERAN | 2 |
| ISO E SUPER | 80 |
| PATCHOULIOEL ENTF. DM | 7 |
| SANDRANOL ® | 15 |
| EVERNYL | 0.8 |
| ETHYLENBRASSYLAT | 90 |
| INDOL FF 10% DOC | 2 |
| DIOCTYL ADIPATE | 387.4 |
| Parts in g: | 1.100.00 |

5 wt.-% of the compound of formula (I) are added to perfume oil 3.

The addition of the compound of formula (I) to the perfume oils shown above gave a more rounded, floral, green, fruity scent with a strong effect in applications.

The invention claimed is:

1. A fragrance mixture comprising:

(a) a compound of formula (I), and

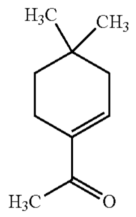

(I)

(b) one or more fragrance(s) having a green and/or flowery scent.

2. The fragrance mixture of claim 1, wherein the one or more fragrance(s) having a green and/or flowery scent is/are selected from (3Z)-hex-3-en-1-ol, (3Z)-hex-3-en-1-yl acetate, 1-(5,5-dimethylcyclohexen-1-yl)pent-4-en-1-one, 2,4-dimethylcyclohex-3-ene-1-carbaldehyde, [(Z)-hex-3-enyl] methylcarbonate, allyl-2-(cyclohexoxy)acetate, 2-phenylethanol, 4-acetoxybenzyl acetate, methyl-2-(3-oxo-2-pentylcyclopentyl)acetate, 1-(4-isopropylcyclohexyl) ethanol, (E)-3-methyl-4-(2,6,6-trimethylcyclohex-2-en-1-yl)but-3-en-2-one, 3-methyl-5-phenyl-pentan-1-ol, or 2,2-dimethyl-3-(3-methylphenyl)propan-1-ol.

3. The fragrance mixture of claim 1, wherein (a) is present in an amount of 0.01 to 30 wt.-%, with respect to a total weight of (b).

4. The fragrance mixture of claim 1, further comprising one or more further components selected from further fragrances, solvents, additives, or excipients, wherein (a) is present in an amount of 0.01 to 10 wt.-%, with respect to a total weight of the fragrance mixture.

5. A method for producing a fragrance mixture of claim 1 comprising:

(i) mixing (a) with (b) and, optionally, with further components.

6. A method for enhancing and/or modifying a green and/or flowery scent comprising mixing:

(a) a compound of formula (I), and (I)

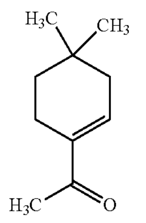

(b) one or more fragrance(s) having a green and/or flowery scent.

7. The method of claim 6, wherein the one or more fragrance(s) having a green and/or flowery scent is/are selected from (3Z)-hex-3-en-1-ol, (3Z)-hex-3-en-1-yl acetate, 1-(5,5-dimethylcyclohexen-1-yl)pent-4-en-1-one, 2,4-dimethylcyclohex-3-ene-1-carbaldehyde, [(Z)-hex-3-enyl] methylcarbonate, allyl-2-(cyclohexoxy)acetate, 2-phenylethanol, 4-acetoxybenzyl acetate, methyl-2-(3-oxo-2-pentylcyclopentyl)acetate, 1-(4-isopropylcyclohexyl) ethanol, (E)-3-methyl-4-(2,6,6-trimethylcyclohex-2-en-1-yl)but-3-en-2-one, 3-methyl-5-phenyl-pentan-1-ol, or 2,2-dimethyl-3-(3-methylphenyl)propan-1-ol.

8. The method of claim 6, wherein the compound of formula (I) is mixed with the one or more fragrances having a green and/or flowery scent in an amount of 0.01 to 30 wt.-%, with respect to a total weight of the one or more fragrances having a green and/or flowery scent.

9. A perfumed product comprising the fragrance mixture of claim 1.

10. The perfumed product of claim 9, wherein the product is selected from perfume extracts, eau de parfums, eau de toilettes, after-shave, eau de colognes, pre-shave-products, splash colognes, perfumed wet wipes, acidic, alkalic and neutral cleaning agents, textile refreshener, iron aids, liquid laundry soaps, laundry soap powders, laundry pretreatment agents, fabric softeners, cleaning soaps, cleaning tabs, disinfectants, surface disinfectants, air improver, aerosol sprays, waxes and polishes, body care products, hand crèmes and lotions, foot crèmes and lotions, hair removal crèmes and lotions, aftershave crèmes and lotions, tanning crèmes and lotions, hair care products, deodorants and antiperspirants, products of decorative cosmetics, candles, lamp oils, incense sticks, insecticides, repellents, or blowing agents.

11. The perfumed product of claim 9, wherein the fragrance mixture is present in an amount of 0.01 to 10 wt.-%, with respect to a total weight of the product.

12. A method for producing a perfumed product comprising:

(i) providing a fragrance mixture of claim 1, (ii) providing further components of the perfumed product, and (iii) contacting the further components of the perfumed product provided in (ii) with a sensorially effective amount of the fragrance mixture provided in (i), wherein the amount of the compound of formula (I) is sufficient to enhance and/or modify the green and/or flowery scent of the fragrance(s) of (b), wherein modifying a green and/or flowery scent renders the scent more fruity and/or softer and/or more fresh and/or more natural, and/or wherein the amount of the compound of formula (I) is sufficient to mask or decrease a plastic or technical note of the fragrance(s) of (b).

13. The method of claim 12, wherein the one or more fragrance(s) having a green and/or flowery scent is/are selected from alcohols having a molecular weight of 95 to 180 g/mol, esters having a molecular weight of 140 to 230 g/mol, or aldehydes and ketones having a molecular weight of 135 to 230 g/mol.

14. The method of claim 13, wherein the one or more fragrance(s) having a green and/or flowery scent is/are selected from (3Z)-hex-3-en-1-ol, (3Z)-hex-3-en-1-yl acetate, 1-(5,5-dimethylcyclohexen-1-yl)pent-4-en-1-one, 2,4-dimethylcyclohex-3-ene-1-carbaldehyde, [(Z)-hex-3-enyl] methylcarbonate, allyl-2-(cyclohexoxy)acetate, 2-phenylethanol, 4-acetoxybenzyl acetate, methyl-2-(3-oxo-2-pentylcyclopentyl)acetate, 1-(4-isopropylcyclohexyl) ethanol, (E)-3-methyl-4-(2,6,6-trimethylcyclohex-2-en-1-yl)but-3-en-2-one, 3-methyl-5-phenyl-pentan-1-ol, or 2,2-dimethyl-3-(3-methylphenyl)propan-1-ol.

15. The method of claim 13, wherein the compound of formula (I) is in an amount of 0.01 to 30 wt.-%, with respect to a total weight of the one or more fragrance(s) having a green and/or flowery scent.

16. The fragrance mixture of claim 1, wherein the one or more fragrance(s) having a green and/or flowery scent is/are selected from alcohols having a molecular weight of 95 to 180 g/mol, esters having a molecular weight of 140 to 230 g/mol, and aldehydes and ketones having a molecular weight of 135 to 230 g/mol.

17. The fragrance mixture of claim 1, wherein (a) is present in an amount of 0.1 to 20 wt.-%, with respect to a total weight of (b).

18. The fragrance mixture of claim 1, wherein (a) is present in an amount of 1 to 10 wt.-%, with respect to a total weight of (b).

19. The fragrance mixture of claim 1, further comprising one or more further components selected from further fragrances, solvents, additives, or excipients, wherein the compound of formula (I) is present in an amount of 0.1 to 7 wt.-%, with respect to a total weight of the fragrance mixture.

20. The fragrance mixture of claim 1, further comprising one or more further components selected from further fragrances, solvents, additives, or excipients, wherein the compound of formula (I) is present in an amount of 1 to 5 wt.-%, with respect to a total weight of the fragrance mixture.

* * * * *